United States Patent
Egner-Walter

(10) Patent No.: US 6,832,802 B2
(45) Date of Patent: Dec. 21, 2004

(54) WIPER SYSTEM FOR A GLASS PANE OF A MOTOR VEHICLE

(75) Inventor: Bruno Egner-Walter, Heilbronn (DE)

(73) Assignee: Valeo Wischersysteme GmbH (DE)

(*) Notice: Subject to any disclaimer, the term of this patent is extended or adjusted under 35 U.S.C. 154(b) by 0 days.

(21) Appl. No.: 10/333,455

(22) PCT Filed: Jul. 19, 2001

(86) PCT No.: PCT/EP01/08364

§ 371 (c)(1),
(2), (4) Date: Jan. 20, 2003

(87) PCT Pub. No.: WO02/08032

PCT Pub. Date: Jan. 31, 2002

(65) Prior Publication Data

US 2004/0007895 A1 Jan. 15, 2004

(30) Foreign Application Priority Data

Jul. 21, 2000 (DE) .......................................... 100 35 475

(51) Int. Cl.[7] ............................... B60S 1/04; B60S 1/08
(52) U.S. Cl. ............................... 296/96.17; 296/96.15; 15/250.001; 15/250.31
(58) Field of Search .......................... 296/96.15, 96.17; 15/250.001, 250.14, 250.27, 250.3, 250.31, 250.43, 250.44

(56) References Cited

U.S. PATENT DOCUMENTS

| | | | | |
|---|---|---|---|---|
| 2,693,612 A | * | 11/1954 | Zeigler et al. ........... | 15/250.01 |
| 3,264,670 A | * | 8/1966 | Barenyi et al. .......... | 15/250.27 |
| 3,793,671 A | * | 2/1974 | Gebhard ................... | 15/250.01 |
| 3,851,351 A | * | 12/1974 | Pickles et al. ........... | 15/250.25 |
| 3,893,203 A | * | 7/1975 | Berkelius ................. | 15/250.22 |
| 5,251,861 A | | 10/1993 | Hayashi | |
| 6,240,593 B1 | * | 6/2001 | Murata ...................... | 15/250.3 |
| 6,493,900 B1 | * | 12/2002 | Koumo et al. ............. | 15/250.3 |
| 6,651,291 B2 | * | 11/2003 | Lim .......................... | 15/250.13 |
| 2003/0213087 A1 | * | 11/2003 | Moein et al. .............. | 15/250.3 |

FOREIGN PATENT DOCUMENTS

| | | |
|---|---|---|
| DE | 198 33 404 | 1/2000 |
| GB | 2 325851 | 12/1998 |

* cited by examiner

Primary Examiner—Patricia L. Engle
(74) Attorney, Agent, or Firm—J. Gordon Lewis

(57) ABSTRACT

A wiper system for a glass pane of a motor vehicle includes a fixing device which itself includes at least three fixing mechanisms which are set apart from each other and corresponding receiving devices in which the fixing mechanisms engage the wiper system also includes a contact device having at least one essentially rigid part that is connected to the system and a complementary vehicle-side part the contact device provides the connection between a driving device of the wiper system and a vehicle-side supply device. In order to facilitate the mounting of the wiper system, the vehicle-side part of the contact device is essentially rigidly connected to the vehicle and the two parts of the contact device are aligned in such a way that a contact is established automatically when the wiper system is fixed to the vehicle.

22 Claims, 3 Drawing Sheets

WIPER SYSTEM FOR A GLASS PANE OF A MOTOR VEHICLE

BACKGROUND

The present invention relates to a wiper system for a glass pane of a motor vehicle with a securing device which comprises securing members spaced apart from each other and corresponding receiving devices which the securing members can engage, and with a contact device which comprises at least one part fastened essentially rigidly to the wiper system and a part complementary to this on the vehicle side, the parts allowing the wiper system to be connected to a supply device on the vehicle side.

A wiper system of this kind is known from DE 198 33 404 A1. The wiper system disclosed in this patent comprises a supporting structure on which a total of three securing members configured as cylindrical mounting pins are provided. The mounting pins are inserted axially into receiving holes which are located in special holders on the vehicle side. Wiper bearings are furnished on the supporting structure, to which wiper arms can be attached. Wiper shafts carried in the wiper bearings are set into a cyclical oscillating motion by a drive motor through a connecting linkage. The electrical connection of the drive motor to the power supply on the vehicle side is made through a female connector molded to the motor housing, the contact containing suitable electrical contacts.

During assembly of the wiper system to the vehicle, the wiper system is first attached to the vehicle by insertion, meaning without bolts, and then a plug connector provided on the vehicle side, which is connected by a flexible cable to the power supply, is inserted into the socket connector.

The disadvantage of the known wiper system is that its assembly is still relatively time-consuming, in spite of the simplified attachment procedure for the wiper system.

The object of the present invention is therefore to further develop a wiper system of the described kind so that it can be mounted more quickly and still securely to the vehicle.

This object is attained by the part of the contact device on the vehicle side being connected essentially rigidly to the vehicle and the two parts of the contact device being aligned in such a way that contact is achieved automatically when the wiper system is attached to the vehicle.

In accordance with the invention, the vehicle-side part is no longer connected to the vehicle by means of a flexible cable such that it is freely moveable, but is instead connected rigidly, so that it acts in concert with the wiper-side part of the contact device when the wiper system is attached to the vehicle, without additional manual activity on the part of a user. The two parts of the contact device are so disposed and aligned that they are in such close proximity that, after the wiper system has been mounted to the vehicle, the contact elements of the individual parts of the contact device touch and contact is achieved automatically as a result.

In this way, in a single operation, the wiper system is first, mechanically attached to the vehicle and secondly, contacts which are needed to operate the wiper system are achieved in the same operation. Assembly of the wiper system to the vehicle is speeded up, which can save costs during production. In addition, quality defects on the vehicle as the result of the proper contacts being forgotten during assembly of the wiper system are prevented.

In one aspect of the invention, the contact device is located in the proximity of the attachment point whose securing member is the last to engage the receiving device during the wiper system attachment procedure. This has the advantage that relative movements of the contacts in the contact device are avoided, the movements occurring if it were necessary for other securing members to engage corresponding receiving devices after contact had been achieved. In certain circumstances, this kind of relative movement of the contacts could result in the contacts being damaged.

It is especially preferred of the directional motion of the contacts in the contact device corresponds to the direction of installation during the process of attaching the wiper system. In this further development of the invention, complicated mechanical equipment which transfers the direction of installation into corresponding contact movements is avoided.

Especially advantageous is the further development is in which the contact device has an aligning device, and the part of the contact device on the wiper system side exhibits lateral play with respect to the wiper system, and/or the vehicle-side part of the contact device exhibits lateral play with respect to the vehicle-side part for tolerances. This takes account of the fact that because of manufacturing tolerances, the wiper system side of the contact device and the vehicle side part of the contact device are possibly not exactly aligned to each other initially. This alignment takes place automatically during the procedure of attaching the wiper system to the vehicle through the aligning device and the play.

In another further development, the wiper system side and/or the vehicle side part of the contact device is flexibly mounted in the direction of its installation. This compensates for axial production tolerances which could result in a gap still remaining between the two parts of the contact device after installation, or said parts pressing against each other with too great a force.

The further development in which the contact device comprises a plug connector and a socket connector is particularly easy to produce.

The orientation of the plug connector with respect to the socket connector is made possible in a simple fashion if the plug connector has a centering chamfer. Another further development goes in the same direction, in which the socket connector has a centering chamfer.

Production of the contact device is simplified and good sealing is achieved by molding the plug connector to the drive device of the wiper system.

A characteristic of another further development of the invention is that the plug connector and/or the socket connector includes a moisture seal. This increases the operational reliability of the wiper system under the invention.

Finally, in accordance with the invention another further development is proposed in which an electrical contact for the drive device and for a fill-level sensor and/or a fluid sensor as required is achieved through the contact device. In the case of this inventive wiper system, all the contacts necessary for operation of the wiper system can be made through the contact device, which saves additional steps and thus assembly costs.

BRIEF DESCRIPTION OF THE DRAWING

An aspect of the invention is explained in detail in what follows with reference to the attached drawing. In the drawing.

DETAILED DESCRIPTION

Figure 1:
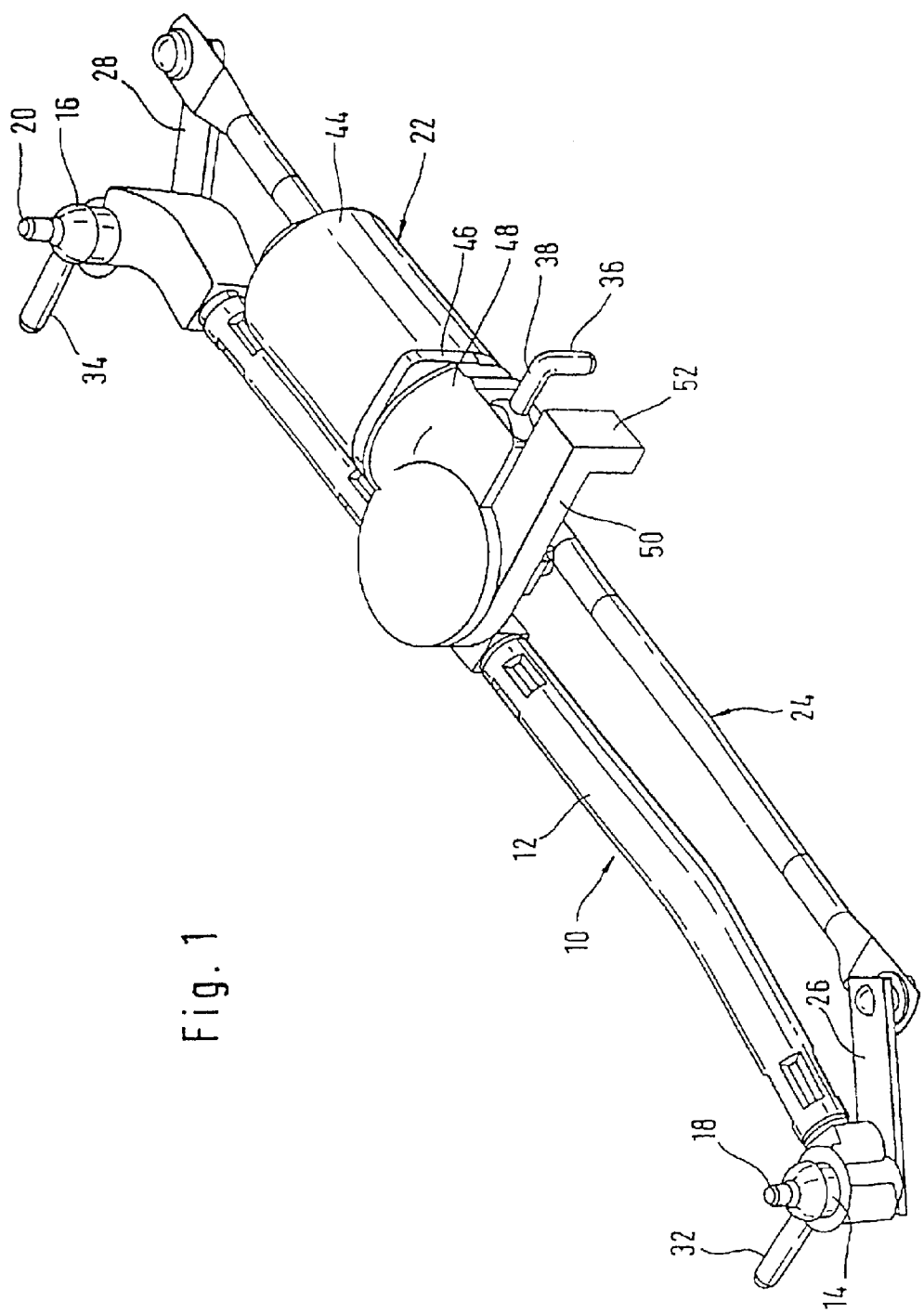
FIG. 1. shows a perspective illustration of a windshield wiper system with a part of contact device on the system side.

A windshield wiper system for a motor vehicle has the overall reference numeral 10 in FIG. 1. It comprises a tubular supporting structure 12 which carries a bearing housing 14 or 16 at both ends. In each bearing housing 14 or 16, a wiper shaft 18 or 20 to receive a windshield wiper arm is secured axially and carried so as to be rotatable.

A drive device 22, which operates on a connecting linkage 24, sits approximately in the center section of the supporting structure 12. One end of the connecting linkage 24 is connected in an articulated manner to a crank 26, which in turn is rigidly coupled to the wiper shaft 18. The other end of the connecting linkage 24 is connected in an articulated manner to a crank 28 which is rigidly coupled to the other wiper shaft 20.

The windshield wiper system can be attached by means of a screwless plug-in connection below a windshield of a vehicle body, the windshield not being shown in the drawing. For this purpose, each bearing housing 14, 16 carries a cylindrical mounting pin 32, 34. The left mounting pin in FIG. 1 projects from the bearing body 14 at a right angle to the wiper shaft on the one hand, and on the other hand to the supporting structure 12 overall. The same applies to the right mounting pin 34 in FIG. 1, which is aligned parallel to the mounting pin 32. An additional cylindrical mounting pin has the reference numeral 36 and is rigidly attached to a spacer element 38 on the side of the drive device 22 away from the supporting structure 12.

As a group, the mounting pins 32, 34 and 36 lie at the angles of a triangle and form a stable support base.

Figure 2:
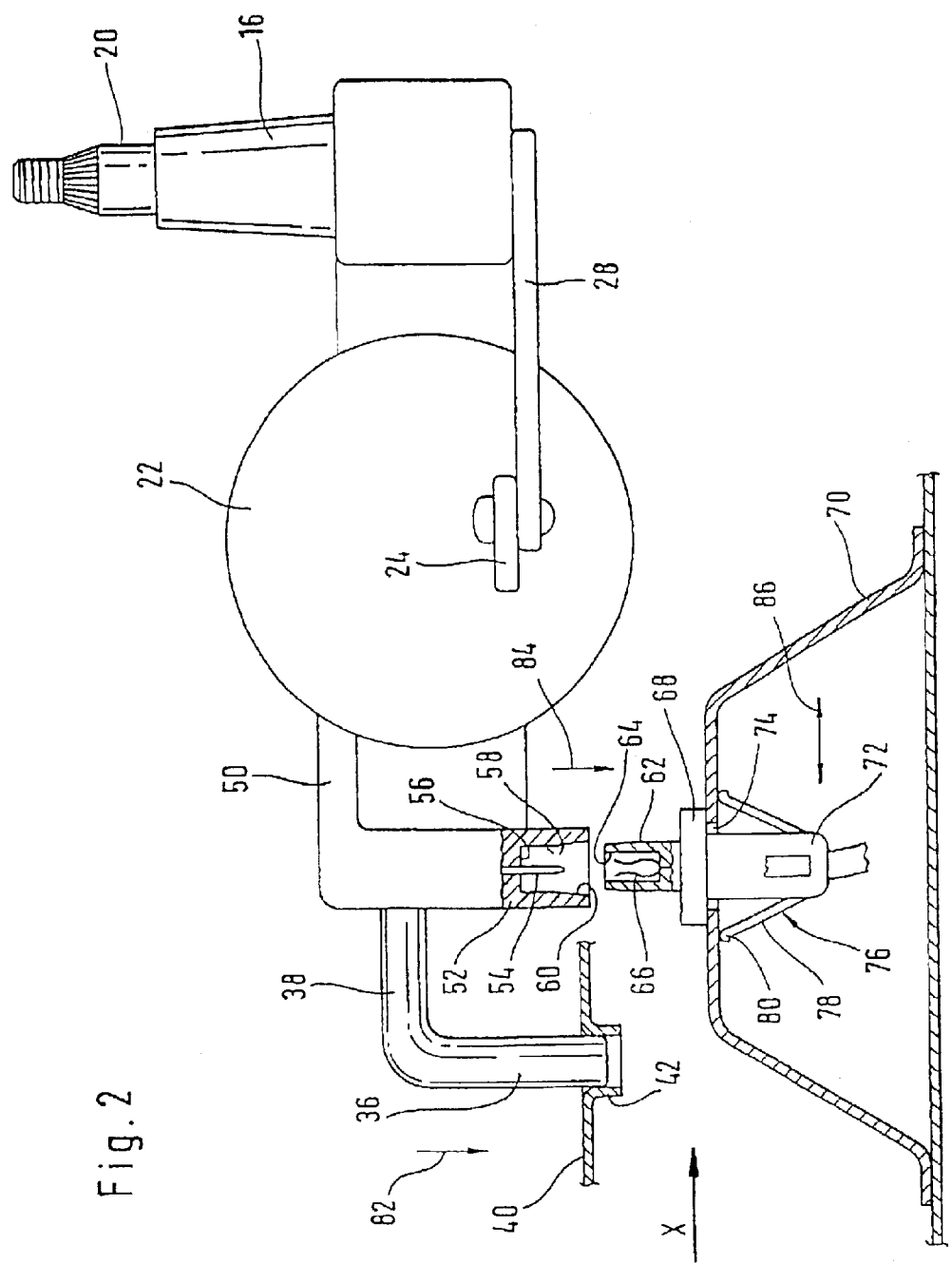
FIG. 2 shows a partially sectioned side view of the windshield wiper system of FIG. 2 including a part of the contact device on the vehicle side.
Figure 3:
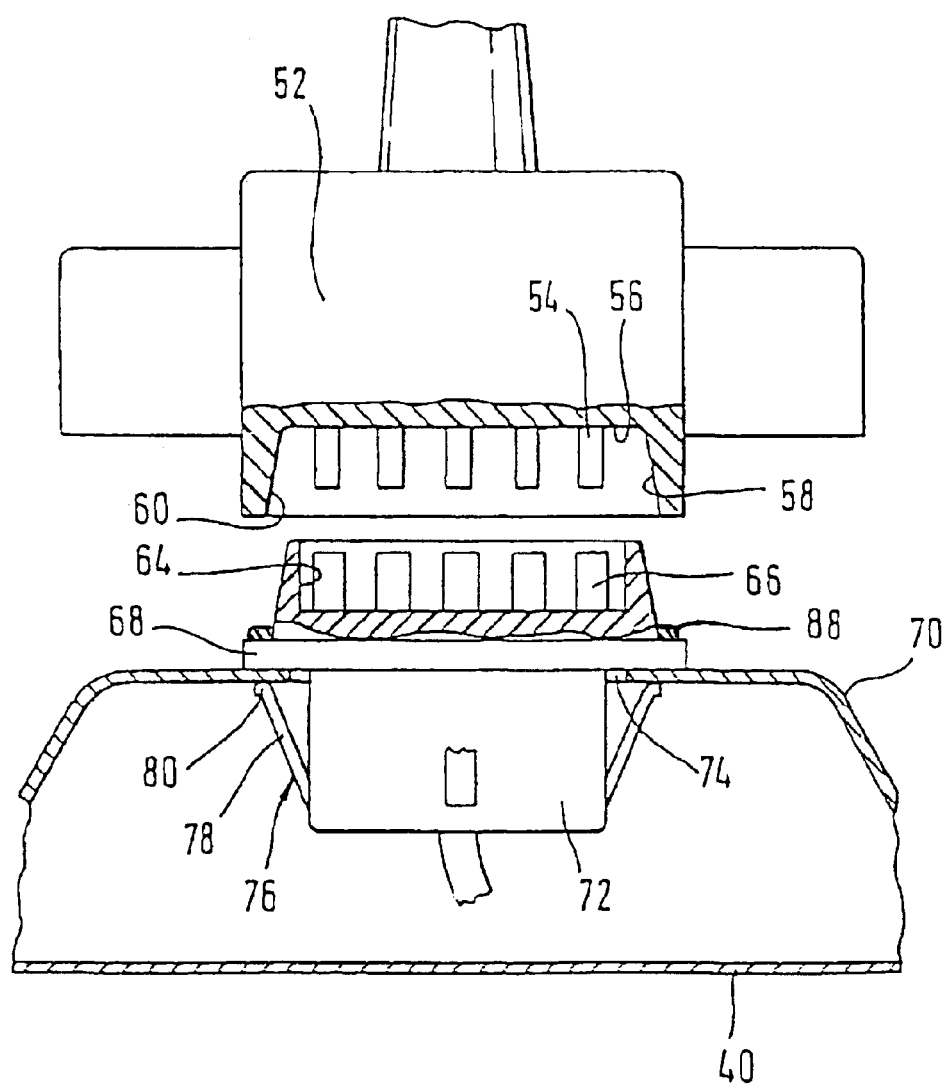
FIG. 3 shows a partially sectioned view in the direction of the arrow X from FIG. 2.

Receiving devices are furnished on the vehicle side to attach the windshield wiper system 10 to the vehicle, of which only the one for mounting pin 36 is shown in FIG. 2. Its receiving device consists of an opening in a structural metal panel 40 on the vehicle, which forms a tubular section 42 to receive the mounting pin 36.

The drive device 22 comprises basically an electric motor 44 which is flanged to a gear 48 by means of a flange 46. A conduit for electrical conductors 50 is molded to the housing for the gear 48, said conduit extending essentially at a right angle to the supporting structure 12 and parallel to the spacer element 38 on the side of the drive device 22 away from the supporting structure 12. The electrical conductor conduit 50 ends laterally a little before the spacer 38. A plug connector is molded onto this end, the connector having a basically rectangular cross section and extending downward at a right angle from the electrical conductor conduit 50 parallel to the mounting pin 36.

Electrical conductors (not shown) are carried in the conductor conduit 50, which are connected to contacts 54 which project from a base 56 of a recess disposed at the lower end of the connector 52. In this way the contacts 54 are protected to the outside, particularly during storage and transportation of the windshield wiper system 10. The inside clearance of the recess 58 becomes greater from the base 56 to the lower edge. The sidewalls of the recess 58 are thus configured as guide chamfers 60.

The gear housing 48, the conductor conduit 50 and the connector 52 are produced in one step by injection molding. An electrically insulating composite plastic is used as the material. The contacts 54, as well as the conductors, not shown, are cast into the composite plastic material. Since the conductor conduit 50 protrudes freely over a certain distance from the gear housing 48 and is made from a generally flexible composite plastic material, the conductor conduit 50 to some extent forms a flexible mounting for the male connector 52.

The vehicle-side part of the contact device comprises a female connector 62, whose outer contour is conical and complementary to the recess 58 in the male connector 62. There is a recess 64 in the upper area in the female connector 62, with spring contacts 66 matching the male connector contacts 54 positioned in the recess. The spring contacts 66 in turn are connected through conductors, not shown, to a vehicle-side supply device, also not shown, for example, a generator or a battery.

The female connector 62 has a collar 68 at a distance from its upper end. The distance between the upper end of the female connector 62 and the collar 68 is somewhat greater than the depth of the recess 58 in the male connector 52. The female connector 62 lies with the collar 68 against the upper side of a yoke-shaped bracket 70. The female connector 62 extends downward with a connecting section 72 through a recess 74 in the bracket 70, where the diameter of the recess 74 is somewhat larger than the diameter of the connecting section 72. Clamping straps 76 are formed on the lower end of the female connector 62 which have a spring section 78 and a clamping section 80. The clamping straps 76 extend upward in the direction of the collar 68. The length of the clamping straps 76 is calculated such that they press against the bracket 70 from the underside. In this way the female connector 62 is held under tension in an axially secure manner against the bracket 70, but at the same time, because of the play existing between the connector section 72 and the recess 74 in the bracket 70, it can be moved radially. The bracket 70 is in turn attached to the structural metal panel 40 of the vehicle. To increase the operational reliability of the wiper system at least one of the male connector 52 and female connector 62 includes a moisture seal 88.

Assembly of the wiper system 10 to the vehicle is carried out as follows:

First, the mounting pins 32, 34 and 36 are installed into the corresponding tubular sections 42 (as shown by arrow 82 in FIG. 2). As a result, the wiper system 10 is positioned precisely with respect to the vehicle. During the further installation process, the male connector 52 is pushed onto the female connector 62, as indicated by the arrow 84 in FIG. 2. The positioning chamfer 60 of the recess 58 in the male connector 52 acts in concert with the outside contour of the female connector 62 such that the female connector 62 aligns itself axially in a straight line within its lateral play with respect to the bracket 70, as shown by the arrows 86.

Then the contacts 54 in the male connector 52 engage the spring contacts 66 in the female connector 62, whereby the electrical contact between the windshield wiper system 10 and the supply device on the vehicle side is completed. Because of the flexibility of the bracket 70 on the one part and the conductor conduit 50 on the other, axial manufacturing tolerances can be taken up without any difficulty.

In this way, firstly, the windshield wiper system 10 is attached to the vehicle and, secondly, the electrical contact between the drive device 22 and the supply device on the vehicle is completed in a single operation.

In an aspect of the invention that is not shown, contacts for a fluid-level sensor are formed into the male connector and the matching female connector. A fluid contact by which two lines or hoses are connected to each other can also be implemented in the contact device.

What is claimed is:

1. A wiper system for a glass pane of a motor vehicle includes a motor supported on a wiper drive support structure mountable to the vehicle with a securing device which includes securing members and corresponding receiving devices associated with the vehicle which the securing members can engage, and a contact device which includes at least one part connected in an essentially rigid manner to the wiper drive support structure and a complementary part on the vehicle side and through which system at least the motor can be connected to a supply device on the vehicle side, wherein the part of the contact device on the vehicle side is connected in an essentially rigid manner to the vehicle and the two parts of the contact device are aligned such that contact is completed automatically when the wiper drive support structure is attached to the vehicle.

2. The wiper system from claim 1, wherein the contact device is located in the proximity of an attachment point whose securing member is the last to engage the receiving device in the process of installing the wiper system.

3. The wiper system from claim 1, wherein the direction of motion of the contacts of the contact device corresponds approximately to the direction of attachment in the process of installing the wiper system.

4. The wiper system from claim 1, wherein the contact device has an aligning device, and wherein a part of the contact device on the motor side of the contact device has lateral play with respect to the wiper drive support structure and a part of the contact device on the vehicle side of the contact device has lateral play with respect to the vehicle.

5. The wiper system from claim 1, wherein a portion of one of the part on the motor side and the part on the vehicle side of the contact device is mounted flexibly in the direction of attachment.

6. The wiper system from claim 1, wherein the contact device comprises a male and a female connector.

7. The wiper system from claim 6, wherein the male connector has a centering chamfer.

8. The wiper system from claim 6, wherein the female connector has a centering chamfer.

9. The wiper system from claim 6, wherein the male connector is molded to the wiper drive support structure for the wiper system.

10. The wiper system from claim 6, wherein the male connector and the female connector includes a moisture seal.

11. The wiper system from claim 1, wherein an electrical contact for one of a drive device, a sensor, and a fluid contact is created through the contact device.

12. A wiper system for a motor vehicle comprising a first portion fixed to the vehicle and a second portion mountable to the first portion, said first portion including one part of a contact device connected to a supply device on the vehicle and at least one receiving device, said second portion including a motor supported on a wiper drive support structure, at least one securing member for engagement to the at least one receiving device, and a second part of the contact device, wherein the first part of the contact device is connected in an essentially rigid manner to the vehicle and the first and second parts of the contact device are aligned such that contact is completed automatically when the wiper system is attached to the vehicle.

13. The wiper system from claim 12, wherein the contact device is located in the proximity of an attachment point whose securing member is the last to engage the receiving device in the process of installing the wiper system.

14. The wiper system from claim 12, wherein the direction of motion of the contacts of the contact device corresponds approximately to the direction of attachment in the process of installing the wiper system.

15. The wiper system from claim 12, wherein the contact device has an aligning device, and wherein a component of the contact device on the second portion has lateral play with respect to the motor and the part of the contact device on the first portion has lateral play with respect to the vehicle.

16. The wiper system from claim 12, wherein a component of one of the part of the contact device on the first portion and the part of the contact device on the second portion is mounted flexibly in the direction of attachment.

17. The wiper system from claim 12, wherein the contact device comprises a male and a female connector.

18. The wiper system from claim 17, wherein the male connector has a centering chamfer.

19. The wiper system from claim 17, wherein the female connector has a centering chamfer.

20. The wiper system from claim 17, wherein the male connector is molded to a drive device for the wiper system.

21. The wiper system from claim 17, wherein the male connector and the female connector includes a moisture seal.

22. The wiper system from claim 12, wherein an electrical contact for one of a drive device, a sensor, and a fluid contact is created through the contact device.

* * * * *